US005151572A

United States Patent [19]

Jack

[11] Patent Number: 5,151,572

[45] Date of Patent: * Sep. 29, 1992

[54] METHOD OF MAKING A STENCIL FOR ETCHING GLASS

[75] Inventor: David E. Jack, Irvine, Calif.

[73] Assignee: Prevent-A-Crime International, Inc., Santa Ana, Calif.

[ * ] Notice: The portion of the term of this patent subsequent to Jan. 22, 2008 has been disclaimed.

[21] Appl. No.: 605,518

[22] Filed: Oct. 29, 1990

Related U.S. Application Data

[63] Continuation-in-part of Ser. No. 351,425, May 12, 1989, Pat. No. 4,987,287.

[51] Int. Cl.[5] .............................................. B23K 26/00

[52] U.S. Cl. ........................... 219/121.69; 364/474.08

[58] Field of Search ...................... 219/121.68, 121.69; 364/474.08

[56] References Cited

U.S. PATENT DOCUMENTS

| | | | |
|---|---|---|---|
| 3,668,028 | 6/1972 | Short | 156/643 |
| 3,696,742 | 10/1972 | Parts et al. | 101/128.4 |
| 3,790,744 | 2/1974 | Bowen | 219/121.85 |
| 4,316,766 | 2/1982 | Levin et al. | 156/631 |
| 4,323,757 | 4/1982 | Oka et al. | 219/121.72 |
| 4,415,284 | 11/1983 | Floyd | 400/134 |
| 4,497,848 | 2/1985 | Baran | 427/106 |
| 4,530,061 | 7/1985 | Henderson et al. | 219/121.67 |
| 4,549,063 | 10/1985 | Ang et al. | 219/121.69 |
| 4,578,281 | 3/1986 | Ebisawa et al. | 427/53.1 |
| 4,585,514 | 4/1986 | Scallan | 156/631 |
| 4,781,792 | 11/1988 | Hogan | 156/663 |

FOREIGN PATENT DOCUMENTS

| | | |
|---|---|---|
| 2900479 | 7/1980 | Fed. Rep. of Germany . |
| 60-08629 | 2/1985 | Japan . |
| 61-19186 | 3/1986 | Japan . |
| 61-07846 | 4/1986 | Japan . |
| 61-21246 | 9/1986 | Japan . |
| 60-18616 | 9/1987 | Japan . |
| 656348 | 6/1986 | Switzerland . |

OTHER PUBLICATIONS

Xerox copy of a two page list highlighting four titles including Brazil patent appln. 842484; Spain appln. 524229; Brazil appln. 851205 and Spain appln. 524632 (abstracts).

Copy of a 6 page brochure entitled LightWriter CO2 Laser Marking System by Lumonics Marking Corp.

*Primary Examiner*—C. L. Albritton

*Attorney, Agent, or Firm*—Knobbe, Martens, Olson & Bear

[57] ABSTRACT

A laser beam cuts a thin stencil template from a label. The label includes a layer or facestock of polyester which can withstand a harsh environment, and a protective topcoat of a polyester resin and a silicone particulate. The label has a releasable adhesive applied to its lower surface, the adhesive being covered with a backing strip which is coated to facilitate separation from the adhesive. The laser light beam is moved so the label and any exterior coating that may be on it is "cut" or vaporized to form a pattern. The laser light beam also removes the adhesive material in its path, while leaving the backing strip intact. Use of the stencil includes: removing the backing strip from the label; applying the label to a surface to be etched with the releasable adhesive holding the label where positioned; applying etching compound to the surface to be etched through the stencil; allowing the etching compound to set in the glass for a desired period of time; and removing the stencil; and wiping off any excess etching compound.

19 Claims, 1 Drawing Sheet

METHOD OF MAKING A STENCIL FOR ETCHING GLASS

RELATED APPLICATION

This is a continuation-in-part of U.S. Pat. application Ser. No. 351,425 filed May 12, 1989, now U.S. Pat. No. 4,987,287.

BACKGROUND OF THE INVENTION

This invention relates to a method of making a stencil and a method of applying a marking to a surface by the use of a stencil, particularly a stencil having the precision cutting and chemical composition required for etching glass.

Vehicle identification numbers are sometimes etched into the glass windows of the vehicle. Such an arrangement is desirable in that the markings are permanent, yet unobtrusive.

U.S. Pat. No. 4,585,514 - Scallan and U.S. Pat. No. 4,781,792 - Hogan, disclose systems for etching glass wherein a stencil template is cut with an electric typewriter and subsequently adhered to glass by the use of a wetting technique. An etching compound is then applied to the stencil for a period of time, following which the stencil is removed and the window wiped clean. In the wetting technique, the cut stencil is displaced or otherwise wet with water or a solvent. The glass area to be etched is thoroughly cleaned and the area moistened prior to the application of the stencil to the surface to be etched. The stencil is held in place by capillary action. However, any mixing of the residual wetting agent and the etching compound may produce an incomplete etching action on the surface of the material to be etched due to a dilution of the etching compound, thereby requiring that the stencil and surrounding area be carefully blotted to be free of exposed wetting agent prior to etching compound application.

A stencil cut with an electric typewriter has also been applied to glass with an adhesive. The stencil material is furnished with adhesive applied to its backside and covered by a backing strip. The stencil is then "cut" with the electric typewriter, which does not penetrate the backing strip. The backing strip is removed when the stencil is to be applied to the glass. While this approach is convenient for application to the glass, the cut provided by the typewriter is not sharp and clear. A primary reason for this is that the stencil material removed or displaced by the typewriter key is relatively fibrous, and hence leaves a rather fuzzy line, rather than a sharp one. Similarly, the adhesive material is not completely removed in a sharp well-defined line, being only pushed aside or partially removed. Such adhesive material remaining in the area desired to be etched interferes with the etching compound.

Another disadvantage of the stencil material that will be "cut" by the typewriter key is that it is somewhat delicate such that it requires care and skill in handling and positioning it on the glass after removal of the backing strip. Repositioning is particularly difficult if that should be necessary to obtain proper alignment on the glass. Letters requiring an unsupported free end, such as the pair of horizontal fingers needed in framing a capital "E", may become blurred as a result of the misalignment of the unsupported fingerlike tips.

U.S. Pat. No. 4,316,766 discloses a stencil for etching glass wherein the stencil is cut by electrostatic means, and adhesive is then applied to the back of the stencil to attach it to the surface to be marked.

A need exists for an improved stencil and stencil forming method, as well as a method for utilizing a stencil produced by such a method for etching glass or in conjunction with other types of stenciling operations.

It is therefore an object of the present invention to provide a method of cutting stencil templates using non-mechanical means to produce a consistent, repeatable cut with a degree of preciseness heretofore unachieved in the art.

Another object of the present invention is to produce a stencil template which is directly adherable to the surface to be etched, and is capable to maintain readily its shape when being handled and positioned or repositioned on the surface to be etched.

SUMMARY OF THE INVENTION

A laser beam is utilized to mark or cut a thin stencil template comprising a label having a releasable adhesive backing surface covered by removable backing strip. The label includes a layer or facestock of a strong material such as polyester which can withstand a harsh environment. Preferably the polyester label has a protective topcoat comprising a polyester resin in conjunction with a silicone particulate. The label has a releasable adhesive applied to its lower surface, the adhesive covered with a backing strip which is preferably coated to facilitate separation from the adhesive. The laser light beam is applied to a strip of the label material in a manner to "cut" or vaporize the facestock layer and any exterior coating that may be on it. The laser light beam also removes the adhesive material in its path, while leaving the backing strip intact.

When the stencil is to be utilized, the backing strip is removed from the label and the label is applied to the glass or other surface to be etched, with the releasable adhesive holding the label where positioned. The laser operation is performed in a manner so as not to adversely affect the adhesive material in the area immediately around the facestock layer material removed in forming the desired stencil. Consequently, when etching compound is applied to the glass through the stencil, the adhesive surrounding the cut-outs in the stencil prevent the etching compound from etching beneath the label, thereby enabling sharp markinqs to be etched into the glass. Although the system is particularly suited for forming a vehicle identification number on glass, there are many other uses. Further, the stencil created instead of having letters of numbers, may have bar codes or other characters formed therein.

After the etching compound has set in the glass for a desired period of time, it is a simple matter to remove the stencil, as the adhesive is releasable, and to wipe off any excess etching compound. The described technique is convenient, fast, accurate and relatively inexpensive. While the stencil is particularly useful for etching glass, the laser technique may be utilized for making other stencils or other such items, which in turn are used for purposes other than etching glass.

DETAILED DESCRIPTION OF THE PREFERRED EMBODIMENT

Figure 1:
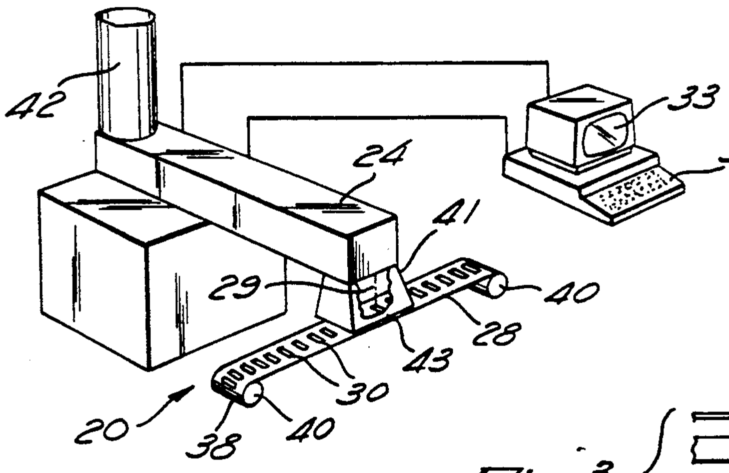
FIG. 1 is a schematic perspective view of an apparatus of the invention.

FIG. 1 illustrates the stencil making apparatus 20 of the instant invention, comprising an integrated laser and optics apparatus 24, an advancement means 28 for advancing stencil templates 30 through the stencil apparatus 20 and a computer 32 with associated software for controlling and coordinating the laser apparatus 24 and advancement means 28. The stencil templates 30 are provided on a continuous tape 38 loaded onto spools 40 and rewound onto spools 40, which are associated with an advancement means 28 integrated with the laser apparatus 24 and the computer 30 to coordinate the running of the labels through the marking apparatus 20 at desired speed and interval.

The computer system 32 preferably comprises a host computer, a laser interface card, a gas transfer control microprocessor and assorted input/output (I/O) peripheral devices, including a printer, a disk storage system, a video display terminal/keyboard/speaker and a bar code reader. One skilled in the art will recognize that a variety of computers and microprocessors can be used.

The user I/O, which comprises a cathode ray tube (CRT) video display 33 or equivalent, and a keyboard and audio speaker, provides for communication with the computer, and hence the entire laser and stencil apparatus, by the human operator of the system. The communications may be by any of the well-known means, including keyboard, screen displayed menus, etc. In one embodiment of the present invention, the human link is provided by a menu driven system, augmented by a bar code reader and keyboard. The bar code reader may be used to read and input to the computer various kinds of data, including, for instance, vehicle identification numbers (VIN) or serial numbers from automobile component parts. Bulk storage of data is preferably provided by a disk storage system and hardcopy output from the computer 32 is provided by a printer.

Typical menu system parameters are shown in Example 1, below. Other means for specific procedures are contemplated, including, for instance, Laser Operation, Automobile Records, Database Maintenance and Hardware/Software Maintenance. One skilled in the art will recognize that additional submenus may be added as desired. Upon completion of the tasks of a particular submenu, control is returned to the main menu.

The system may also preferably have associated with it a printer which may be used to identify each set of stencils 30 with a bar code and/or alphanumeric information, enabling filing and processing of the stencils 30 in an orderly fashion.

A Class 1 enclosure 41 with a fume removal port 42 and adjustable tape platen 43 is used in conjunction with the laser apparatus 24. The platen 43 preferably comprises vertical and horizontal adjustments for changes in laser focus and protects individuals near the apparatus 20 from scattered or deflected laser light. The fume removal port 42 preferably comprises a particulate filter exhaust blower unit which extracts any noxious smoke and fumes resulting from use of the laser apparatus 24.

In a preferred form of the present invention, the laser apparatus 24 comprises a carbon dioxide ($CO_2$) laser marker, such as marketed under the trademark "Light-Writer" by Lumonics Marking Corporation of Camarillo, California. This $CO_2$ laser marker system comprises a closed loop galvanometer beam positioner and focusing lens. In this particular type of laser positioning system, galvanometer-mounted moving mirrors steer a spot of infrared light laterally across the upper surface of the stencil at a desired speed and power setting to "cut" or form a pattern in the stencil. Under computer 30 control, the focused spot of laser light 29 engraves the stencil template 30 with the desired characters or symbols as programmed into the computer 30 and controlled by user interface control software. Such a galvanometer system is preferable for use in conjunction with the apparatus 20, as it reduces the number of mechanical parts required for movement of the laser light 29 across the stencil template 30, thereby reducing the size and cost of the apparatus 20.

EXAMPLE 1

The following software menu parameters and their associated values were used in conjunction with the stencil apparatus 20:

- mark speed: 4500 mils per second (speed of laser beam movement across stencil face)
- power repetition rate: 2000 pulses per second
- character height: 125.0 mil
- character width: 100 mil
- character separation: 75 mil
- line separation: 100 mil
- laser spot diameter: 4 mil
- delay time: 10 nano seconds (delay between the energizing of the laser and the production of the beam)
- relax time: 80 nano seconds (delay between laser pulses)
- passes: 1
- mark mode: straight
- focal distance: 6.7"
- duty cycle: 99% of power
- maximum power: 20 Watts Possibly, some values different than those used in the instant example may be used with the control parameters provided for the laser apparatus 24 to produce the desired laser cutting effect. For instance, power output of the laser light beam may be decreased if the speed at which the beam travels along the stencil 30 is decreased.

Also, the parameters are set to fit the characteristics of the particular stencil to be formed. For example, the focal distance was selected to maximize the laser beam power and precision while accommodating the physical size of the stencil to be formed. With the apparatus employed, the label being "cut" is stationary during that operation, which the laser beam is moved. The beam movement is a swinging action around an emanating spot in the apparatus. Thus, the label must be far enough from the beam emanating spot to allow the beam to provide enough x and y horizontal movement to create the number and size of the characters desired. At the same time, it is desirable that the label be close to the beam emanating spot to maintain its integrity so as to obtain a precise stencil pattern.

Figure 3:
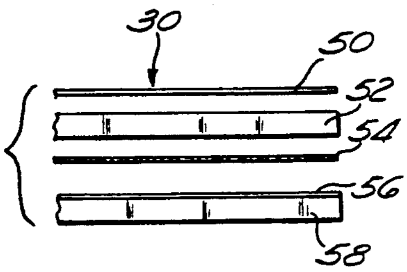
FIG. 3 is a elevational, enlarged, exploded view of the stencil template of FIG. 2, illustrating the individual components of the stencil.

Referring to FIG. 3, the stencil apparatus 20 of the present invention cuts stencils on stencil templates 30. A preferred form of stencil template 30, to be used in conjunction with the instant invention, is a continuous strip of stencil material manufactured by Fasson, Inc., and sold under the trademark and identifier COPY-CODE MATTE WHITE POLYESTER (41074).

The multiple layers comprising the preferred form of the stencil template 30 are, from top to bottom: top coat 50, facestock 52, adhesive 54, and backing strip 58. The facestock 52 is preferably about 2 mils, or as a prototype version, 0.0019" thick polyester with an impact-printer-compatible topcoat 50, preferably from about 0.0006" to 0.0008" in thickness, comprising a polyester resin in conjunction with a silicone particulate. Other thicknesses of facestock may be employed, but a range of 1 to 3 mils is preferable. Polystyrene is another acceptable facestock material.

Each of the layers 52, 50 should have a sufficient thickness and durability, and be of a chemical composition resistant to the chemical compound used for etching or, alternatively, the ink or paint used for stenciling. Beneath the facestock 52 is an adhesive layer 54 preferably comprising an acrylic polymer chemically resistant to the etching compound. The adhesive layer 54 is covered with a backing strip 58 comprised of 50-pound test paper, preferably coated with a release coating 56, most preferably a release coating 56 comprising polysioxane, to facilitate separation of the backing strip 58 from the adhesive layer 54.

It has been determined that a stencil template 30 comprised of the aforementioned layers 50, 52, 54, 58 and layer compositions allows the stencil apparatus 20 to produce a sharp continuous cutting line through the topcoat 50, facestock 52 and adhesive layer 54 of the stencil template 30.

Figure 4:
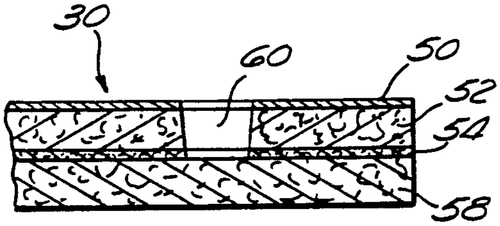
FIG. 4 is a cross-sectional enlargement of the stencil template of FIG. 3, with a stencil cut therein.

Referring to FIG. 4, a cut 60 is depicted in the stencil template 30 which is continuous through to the backing strip 58 which remains substantially intact. Although the adhesive layer 54 is formed with the stencil pattern, the remaining material maintains its integrity both chemically and physically, thereby allowing the stencil 30 to be adhered to the surface to be etched or stenciled. This is particularly important immediately adjacent the pattern so that the etching compound or other marking material later applied to the stencil does not flow beyond the edges of the cut out.

The stencil apparatus 20 produces a cut 60 through the particular stencil 30 composition of the instant invention substantially continuously vertically throughout topcoat 50, facestock 52 and adhesive 54 layers. Additionally, the stencil apparatus 20 produces a continuous horizontal cut (not shown) through the particular stencil 30 composition of the instant invention, providing a clear demarkation of the cut pattern throughout the stencil material. A vertically and horizontally continuous, non-wavy cut provides a sharp, precise etching of the glass in the method of the present invention, as hereinafter described.

Figure 2:
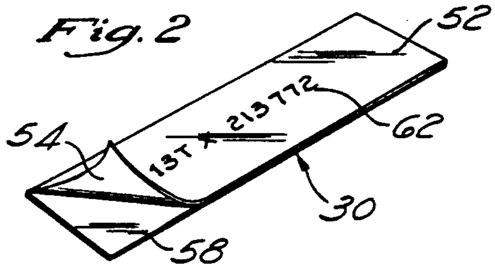
FIG. 2 is a perspective view of the completed stencil template of the instant invention.

Referring to FIG. 2, a preferred embodiment of the stencil 30 of the instant invention is depicted, where individual stencils are marked with an alphanumeric vehicle identification number (VIN) 64, the VIN commonly used in conjunction with the marking and identification of vehicles; specifically; the etching of vehicle windows. A typical VIN 64 contains 17 alphanumeric characters and is preferably made in identical VIN sets of 6–10, according to the number of windows in a car vehicle.

Figure 5:
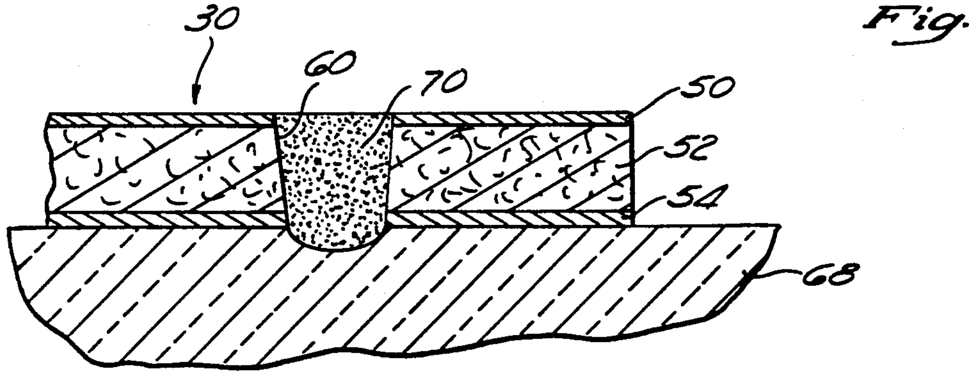
FIG. 5 is a further enlargement of the stencil template of FIG. 4 after placement upon the surface to be etched, an etching composition placed within the stencil cut.

FIG. 5 depicts the placement of the stencil 30 upon the material to be etched, with the stencil 30 backing strip 58 removed and its adhesive layer 54 contacting the material, in this instance, an automobile window 68. The strength of the polyester material is particularly important at this stage, so that the stencil without the backing layer does not tear or lose its shape, thus facilitating handling and placement. Also, if the stencil is not initially positioned accurately, it can be repositioned, due to its strength and the releasable adhesive. After positioning, an etching compound 70 is placed over the stencil 30, leaving a thin coating on the exposed portions of the window 68. The etching compound 70 is prevented from seeping or leaching beneath the facestock 56 of the stencil 30 by virtue of the adhesive layer 54 which has not been harmed by the heat of the laser, and is of a continuous vertical cut relative to the facestock layer. The adhesive layer 54 provides a secure, etching compound resistant bond between the window 68 and the facecoat 52 of the stencil 30.

The cut section 60 of the stencil 30 is depicted filled with etching compound 70 etching into the surface of the window 68. Preferably, the etching compound 70 produces an etch of approximately 1–10 angstroms in depth into the glass. One suitable form of etching compound 70 is produced by McKay Chemical Company, Inc., and is sold under the trademark "VELVET ETCH CORROSIVE LIQUID UN1760." This etching compound is heated, if necessary, to a temperature above 45° F. to facilitate the etching process. This etching compound has the following composition:

ammonium bifluoride - 6%
sodium bifluoride - 28%
inert solids - 22%
water - 41%
other inert ingredients - 3%

Figure 6:
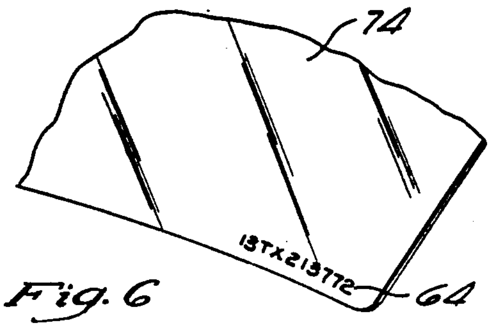
FIG. 6 is an enlarged perspective view of a vehicle window etched with its vehicle identification number by the stencil template of the present invention.

After the etching compound 70 has been applied to the window 68, it is allowed to remain for approximately 3 minutes, and is then thoroughly removed from the surface of the stencil 30 and window 68. At the end of that time, the stencil 30 is removed by peeling it from the window 68. The etched area of the window 68 is thoroughly rinsed and dried thereafter, and the etched window appears as depicted in FIG. 6, with a VIN 64 etched into its surface.

While the method and apparatus of the instant invention has been primarily described as being useful for the application of vehicle identification numbers upon the windows of motor vehicles, the instant invention may be useful for a wide variety of situations or purposes where it is desirable to place markings or identification upon materials. Additionally, the method and apparatus of the instant invention may be desirable for use in conjunction with any presently available stencil marking system, wherein a sharp, accurate stencil pattern is desired, for whatever purpose, including stencils used for marking and painting purposes. In addition to alphanumeric symbols, a stencil may be formed with whatever other characters or symbols are desired, including bar codes.

As another use of the invention, the adhesive layer 54 may include pigment in it that transfers to the surface to be marked when the label is applied and then removed. The pigment thus provides an outline of the marking desired, such as a vehicle identification number. For theft prevention it is desirable that the pigment only be visible under intense ultraviolet light. The use of UV pigment mixed in adhesive on the back of a label is a known technique for indicating when a label has been removed from a stolen article. The use of the above described laser cut stencil with UV pigment enables a clear sharp identifier to be outlined under UV light.

I claim:

1. A method comprising:

applying a laser beam to the upper surface of a label, which includes a face stock layer, a layer of releasable adhesive applied to the lower surface of said face stock and a removable liner covering the adhesive; and producing relative lateral movement between the laser beam and the label to remove the facestock layer and the adhesive layer to create a vehicle identification number in the label layers while not removing the liner, whereby a stencil is created that may be utilized by removing the liner from the adhesive layer and applying the releasable adhesive layer of the facestock to a surface onto which the number is to be marked.

2. The method of claim 1, wherein said label includes a top coat applied to the upper surface of said face stock, and said creating step includes removing the top coat, said face stock layer and adhesive layer throughout said pattern.

3. The method of claim 1, wherein said liner includes a release coating engaging said adhesive, and said liner removing includes removing the release coating with the liner.

4. The method of claim 1, in which said label comprises:

a topcoat layer of polyester resin and silicone particulate;

a facestock layer comprising a polyester;

an adhesive layer comprising an acrylic copolymer;

a release coating comprising a polysioxane; and a liner layer comprised of paper and said removing step entails removing said topcoat, facestock and adhesive layers throughout said pattern, while not removing said liner layer.

5. The method of claim 1, wherein said applying step is performed with a carbon dioxide laser.

6. The method of claim 5, wherein said laser beam, in creating said pattern, is pulsed at a repetition rate of about 2000 pulses per second.

7. The method of claim 1, wherein the laser is energized with a 20 watt power source.

8. The method of claim 7, wherein said movement producing step includes moving said laser beam at a speed of about 4500 mils per second.

9. The method of claim 8, wherein the pattern creating step is performed with a laser beam having a diameter of about 4 mil.

10. The method of claim 1, wherein said facestock layer is between 1 and 3 mils in thickness.

11. The method of claim 7, wherein said facestock layer is made of polyester and is about 2 mils thick.

12. A stencil, comprising:

a facestock layer;

a layer of adhesive applied to the lower surface of said facestock layer; and a removable liner covering said adhesive, a vehicle identification number formed through said facestock layer and said adhesive layer by laser light application thereto.

13. The stencil of claim 12, wherein said facestock layer comprises a polyester.

14. The stencil of claim 12, wherein said facestock layer has associated with it a topcoat layer 15. The stencil of claim 14, wherein said topcoat layer comprises a polyester resin and silicone particulate.

16. The stencil of claim 12, wherein said adhesive layer includes a pigment which is visible in ultraviolet light but not visible in the visible light spectrum, and said pigment is adapted to be mark an article when said liner is removed and said facestock layer is applied to said article and then removed.

17. A method comprising:

applying a laser beam to the upper surface of a label, which includes a face stock layer, a layer of releasable adhesive and pigment visible in ultraviolet light applied to the lower surface of said facestock layer, and a removable liner covering the adhesive and pigment layer; and producing relative lateral movement between the laser beam and the label to remove the facestock layer and the adhesive and pigment layer to create a desired pattern in said layers while not removing the liner, whereby a stencil is created that may be utilized by removing the liner from the adhesive and pigment layer and applying the releasable adhesive and pigment layer together with the facestock layer to a surface onto which the pattern is desired.

18. The method of claim 17 further comprising the steps of:

removing said liner from said adhesive and pigment layer;

applying said stencil to an article with said adhesive and pigment layer contacting the surface of said article; and removing said stencil from said article leaving pigment from said adhesive and pigment layer on said article outlining said pattern.

19. A stencil produced in accordance with the method of claim 1.

* * * * *